(12) United States Patent
Lee et al.

(10) Patent No.: US 9,780,357 B2
(45) Date of Patent: *Oct. 3, 2017

(54) SILICON-BASED ANODE ACTIVE MATERIAL AND SECONDARY BATTERY COMPRISING THE SAME

(75) Inventors: Yong Ju Lee, Daejeon (KR); Soo Jin Park, Ulsan (KR); Hye Ran Jung, Busan (KR); Jung In Lee, Gyeonggi-do (KR); Je Young Kim, Daejeon (KR); Mi Rim Lee, Seoul (KR); Jae Phil Cho, Gyeonggi-do (KR)

(73) Assignees: LG Chem, Ltd. (KR); UNIST (Ulsan National Institute of Science and Technology) (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/566,479

(22) Filed: Aug. 3, 2012

(65) Prior Publication Data

US 2013/0280614 A1 Oct. 24, 2013

(30) Foreign Application Priority Data

Apr. 19, 2012 (KR) .................. 10-2012-0041082
Jul. 13, 2012 (KR) .................. 10-2012-0076952

(51) Int. Cl.
  *H01M 4/04* (2006.01)
  *H01M 4/131* (2010.01)
  (Continued)

(52) U.S. Cl.
  CPC ......... *H01M 4/0471* (2013.01); *H01M 4/131* (2013.01); *H01M 4/364* (2013.01);
  (Continued)

(58) Field of Classification Search
  CPC ........ H01M 4/36; H01M 4/38; C01B 21/0685
  See application file for complete search history.

(56) References Cited

U.S. PATENT DOCUMENTS 5,395,711 A    3/1995  Tahara et al.
5,948,713 A *  9/1999  Smiley et al. .................. 501/5
(Continued)

FOREIGN PATENT DOCUMENTS

CN    102157731 A     8/2011
CN    102214823 A    10/2011
(Continued)

OTHER PUBLICATIONS

Machine translation for Ichikawa, JP 2005-209469 A.*
(Continued)

*Primary Examiner* — Barbara Gilliam
*Assistant Examiner* — Nathanael Zemui
(74) *Attorney, Agent, or Firm* — Lerner, David, Littenberg, Krumholz & Mentlik, LLP

(57) ABSTRACT

Disclosed herein is a silicon-based anode active material, comprising a silicon phase, a $SiO_x$ ($0<x<2$) phase and a carbon dioxide phase. Also disclosed is a secondary battery, which comprises a cathode comprising a cathode active material, an anode active material comprising an anode active material, and a separator, wherein the anode active material comprises a silicon phase, an $SiO_x$ ($0<x<2$) phase and a silicon dioxide phase.

7 Claims, 5 Drawing Sheets mixing an alkaline hydroxide in a polar solvent
and mixing the solution with SiOx SiO heat-treated at a temperature of
750~1000 ℃ for 5~120 minutes silicon-based anode active material

(51) Int. Cl.
*H01M 4/36* (2006.01)
*H01M 4/485* (2010.01)
*H01M 4/62* (2006.01)

(52) U.S. Cl.
CPC ........... *H01M 4/366* (2013.01); *H01M 4/485* (2013.01); *H01M 4/625* (2013.01)

(56) References Cited

U.S. PATENT DOCUMENTS

| | | | |
|---|---|---|---|
| 6,028,127 | A | 2/2000 | Yanagase et al. |
| 6,936,643 | B1 | 8/2005 | Joussen et al. |
| 9,196,896 | B2 | 11/2015 | Jung et al. |
| 9,512,523 | B2 | 12/2016 | Lee et al. |
| 2003/0118905 | A1* | 6/2003 | Fukuoka ............... C09C 1/3045 429/218.1 |
| 2003/0215711 | A1* | 11/2003 | Aramata ................ B82Y 30/00 429/218.1 |
| 2004/0033419 | A1 | 2/2004 | Funabiki |
| 2006/0068287 | A1* | 3/2006 | Morita .................. H01M 4/134 429/223 |
| 2007/0004824 | A1 | 1/2007 | Kim et al. |
| 2007/0049658 | A1 | 3/2007 | Choi |
| 2007/0224508 | A1 | 9/2007 | Aramata et al. |
| 2007/0243369 | A1 | 10/2007 | Park et al. |
| 2008/0145757 | A1 | 6/2008 | Mah et al. |
| 2008/0268338 | A1 | 10/2008 | Lee et al. |
| 2009/0311606 | A1 | 12/2009 | Fukuoka et al. |
| 2010/0112442 | A1 | 5/2010 | Fujikawa et al. |
| 2010/0243951 | A1 | 9/2010 | Watanabe et al. |
| 2011/0020536 | A1 | 1/2011 | Yamamoto et al. |
| 2011/0204489 | A1 | 8/2011 | Lin et al. |
| 2011/0244333 | A1 | 10/2011 | Kawada |
| 2011/0244334 | A1 | 10/2011 | Kawada |
| 2011/0281164 | A1 | 11/2011 | Lee et al. |
| 2012/0100438 | A1 | 4/2012 | Fasching et al. |
| 2012/0231326 | A1 | 9/2012 | Biswal et al. |
| 2012/0258370 | A1* | 10/2012 | Miyoshi .................. C01B 33/24 429/231.6 |
| 2013/0122717 | A1 | 5/2013 | Green et al. |
| 2013/0209883 | A1* | 8/2013 | Park .................... H01M 4/0471 429/218.1 |
| 2014/0030599 | A1 | 1/2014 | Lee et al. |
| 2014/0030602 | A1 | 1/2014 | Park et al. |

FOREIGN PATENT DOCUMENTS

| | | | | |
|---|---|---|---|---|
| CN | 102214824 | A | 10/2011 | |
| DE | 19920719 | A1 | 11/2000 | |
| EP | 0362884 | A2 | 4/1990 | |
| EP | 0814066 | A1 | 12/1997 | |
| EP | 1363341 | A2 | 11/2003 | |
| EP | 2416410 | A2 | 2/2012 | |
| JP | H06325765 | A | 11/1994 | |
| JP | 08208711 | A | 8/1996 | |
| JP | 09188555 | A | 7/1997 | |
| JP | 11-343156 | A | 12/1999 | |
| JP | 2001089213 | A | 4/2001 | |
| JP | 2001-205750 | A | 7/2001 | |
| JP | 2002-042809 | A | 2/2002 | |
| JP | 3685116 | B2 | 4/2003 | |
| JP | 2003-317717 | A | 11/2003 | |
| JP | 2004-047404 | A | 2/2004 | |
| JP | 2004-071542 | A | 3/2004 | |
| JP | 2004323284 | A | 11/2004 | |
| JP | 2004335195 | A | * 11/2004 | ............. H04M 4/58 |
| JP | 3648592 | B2 | 5/2005 | |
| JP | 2005209469 | A | * 8/2005 | ............. H04M 4/58 |
| JP | 2005-310759 | A | 11/2005 | |
| JP | EP 1978580 | A1 | * 10/2008 | ............. H01M 4/131 |
| JP | 2010-225494 | A | 10/2010 | |
| JP | 2011-076788 | A | 4/2011 | |
| JP | WO 2011077654 | A1 | * 6/2011 | ............. C01B 33/24 |
| JP | 2012082126 | A | 4/2012 | |
| JP | 2013509687 | A1 | 3/2013 | |
| KR | 20000009774 | A | 2/2000 | |
| KR | 10-0376605 | B1 | 3/2003 | |
| KR | 2004-0059913 | B1 | 7/2004 | |
| KR | 10-0491874 | B1 | 5/2005 | |
| KR | 100555441 | B1 | 2/2006 | |
| KR | 100562634 | B1 | 3/2006 | |
| KR | 2009-0129504 | A | 12/2009 | |
| KR | 10-1114492 | B1 | 2/2012 | |
| WO | 02079085 | A2 | 10/2002 | |
| WO | 2009119093 | A1 | 10/2009 | |
| WO | 2011124893 | A2 | 10/2011 | |
| WO | 2012126338 | A1 | 9/2012 | |

OTHER PUBLICATIONS

"X-Ray Diffraction Table: Minerals Arranged by X-Ray Powder Diffraction". Mineralogy Database. WebMineral.com. Web. Accessed on: May 16, 2014. >http://webmineral.com/MySQL/xray.php?ed1=4.05&minmax=2#.U3aZGfIdWI8<.*

"Cirstobalite Mineral Data". WebMineral.com. Accessed on: Nov. 29, 2015 <http://webmineral.com/data/Cristobalite.shtml#.Vlum9PIViQI>.*

Office Action from Taiwanese Application No. 96101153 citing search report dated Jul. 29, 2010.

Supplementary European Search Report, EP 06798879, dated Dec. 3, 2009.

Lee et al., "Chemical-Assisted Thermal Disproportionation of Porous Silicon Monoxide into Silicon-Based Muticomponent Systems", Angewandte Chemie International Edition, 2012, 51, 2767-2771.

Kim et al. "Three-Dimensional Porous Silicon Prticles for Use in High-Performance Lithium Secondary Batteries," Angewandte Chem., 2008, 120, pp. 10305-10308.

Veluchamy et al., "Improvement of cycle behavior of SiO/C anode composite by thermochemically generated Li4SiO4 inert phase for lithium batteries," Journal of Power Sources 188 (2009) pp. 574-577.

Tabuchi et al.—Li-doping Process for LixSIO Negative Active Material Synthesized by Chemical Method for Lithium-Ion Cells, Available Online Jun. 2005, Journal of Power Sources, 146, 507-509.

Lee, Jung-In et al, "Highly stable Si-based multicomponent anodes for practical use in lithium-ion batteries." Energy & Environmental Science, 2012, 5, 7878-7882.

Bang, Byong Man et al., "Scalable approach to multi-dimensional bulk Si anodes via metal-assisted chemical etching," Energy and Environmental Science, 2011, 4, 5013-5019.

Chinese Office Action for Application No. 201210276140.2 dated Apr. 3, 2015.

* cited by examiner mixing an alkaline hydroxide in a polar solvent
and mixing the solution with SiOx SiO heat-treated at a temperature of
750~1000 °C for 5~120 minutes silicon-based anode active material

SILICON-BASED ANODE ACTIVE MATERIAL AND SECONDARY BATTERY COMPRISING THE SAME

CROSS-REFERENCE TO RELATED APPLICATIONS

This application claims the priority of Korean Patent Application No. 10-2012-0041082 filed on Apr. 19, 2012 and Korean Patent Application No. 10-2012-0076952 filed on Jul. 13, 2012 in the Korean Intellectual Property Office, the disclosure of which is incorporated herein by reference.

BACKGROUND OF THE INVENTION

Field of the Invention

The present invention relates to a silicon-based anode active material and a secondary battery comprising the same.

Description of the Prior Art

Since the discovery of electricity in the 1800s, primary batteries have developed into secondary batteries, and batteries having low operating voltage have developed into batteries having high operating voltage. Among this variety of batteries, lithium secondary batteries are leading 21st battery technology and are receiving attention as energy storage systems for a variety of applications, including mobile phones and electric vehicles.

Lithium secondary batteries are energy storage devices in which lithium ions move from the anode (negative electrode) to the cathode (positive electrode) during discharge and move from the cathode to the anode during charging when storing energy in the batteries. The lithium secondary batteries have high energy density and low self-discharge rate compared to other types of batteries, and thus are used in a wide range of applications.

General lithium secondary batteries comprise a cathode, an anode, an electrolyte and a separator. In early lithium secondary batteries, lithium metal was used as the anode active material, but was replaced with carbon-based materials such as graphite, because of safety concerns resulting from the repeated charge/discharge cycles. The potential of the electrochemical reaction of the carbon-based anode active material with lithium ions is similar to that of lithium metal, and the change in the crystal structure thereof during the intercalation/deintercalation of lithium ions is low. Thus, the carbon-based anode active material can be repeatedly charged and discharged and has excellent charge/discharge cycle characteristics.

However, in recent years, as the lithium secondary battery market has expanded from small-sized lithium secondary batteries for mobile devices to large-sized lithium secondary batteries for automobiles, there is a newfound need for a technology that can achieve the high capacity and high output of anode active materials. Thus, non-carbon-based anode active materials, including silicon, tin, germanium, zinc and lead-based materials, have been actively developed, which theoretically have capacities higher than carbon-based anode active materials.

Among these, silicon-based anode active materials have a capacity of 4190 mAh/g, which is 11 times higher than the theoretical capacity (372 mAh/g) of the carbon-based anode active materials, and thus have received attention as a substitute for the carbon-based anode active materials. However, in the case of using silicon alone as the anode active material, its volume expands by a factor of 3 or more when it is intercalated by lithium ions. For this reason, the battery capacity decreases as the number of charge/discharge cycles increases, and safety concerns also arise. Thus, in order to commercially use silicon as an anode active material, many studies are required into that battery.

As a result, studies on silicon-based composites have been actively conducted. Among these, studies have been made into the use of a silicon-based material in combination with a carbon-based material. This method was developed to minimize the volume expansion of the silicon active material in order to increase capacity and charge/discharge cycle characteristics. The most fundamental method for synthesizing the composite is to coat the silicon-based material with carbon. This improves the electrical conductivity between active material particles and the electrochemical properties and the properties of the electrochemical reaction with an electrolyte and reduces the volume expansion of the silicon-based particles, resulting in an increase in the battery lifetime. However, there is a problem in that the initial charge/discharge efficiency is deteriorated due to the formation of an irreversible phase by the silicon-based material during initial charge/discharge cycling.

SUMMARY OF THE INVENTION

The present invention provides a silicon-based anode active material for a secondary battery, which can improve the initial charge/discharge efficiency of the secondary battery despite of using the silicon-based material as an anode active material.

The present invention provides a silicon-based anode active material comprising a silicon phase, an $SiO_x$ (0<x<2) phase and a silicon dioxide phase.

The present invention also provides a secondary battery, which comprises a cathode comprising a cathode active material, an anode active material comprising an anode active material, and a separator, wherein the anode active material comprises a silicon phase, an $SiO_x$ (0<x<2) phase and a silicon dioxide phase.

The present invention also provides a method for preparing a silicon-based active material, the method comprising the steps of: dissolving an alkaline hydroxide in a polar solvent and mixing the solution with $SiO_x$ (0<x<2) to prepare a mixture; and evaporating the polar solvent from the mixture, and then heat-treating the mixture.

BRIEF DESCRIPTION OF THE DRAWINGS

In FIG. 2, (a): SiO; (b): particles heat-treated for 30 minutes; (c): particles heat-treated for 60 minutes; and (d): particles heat-treated for 120 minutes.

In FIG. 3, (a): particles heat-treated for 30 minutes; (b): particles heat-treated for 60 minutes; and (c): particles heat-treated for 120 minutes.

DETAILED DESCRIPTION OF THE INVENTION

Figure 1:
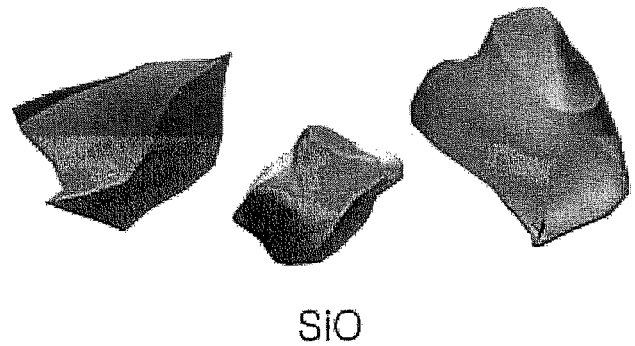
FIG. 1 is a schematic view showing a method for preparing a silicon-based anode active material according to one embodiment of the present invention.
Figure 1:
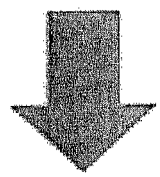
Figure 1:
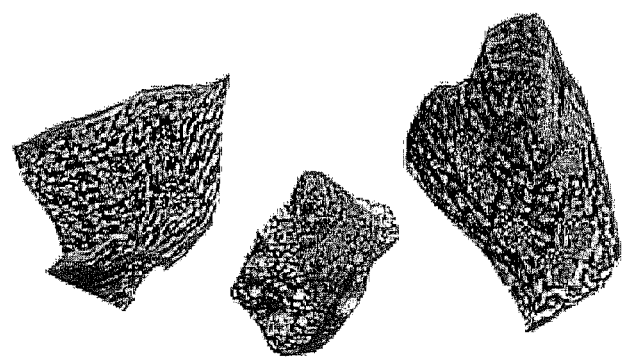

The present invention provides a silicon-based anode active material comprising a silicon phase, an $SiO_x$ (0<x<2) phase and a silicon dioxide phase.

In one embodiment of the present invention, the silicon dioxide phase in the silicon-based anode active material may be dispersed in the $SiO_x$ (0<x<2) phase, and the silicon dioxide phase may be crystalline.

In one embodiment of the present invention, the $SiO_x$ in the silicon-based anode active material may be commercially easily available silicon monoxide (SiO), and the silicon dioxide phase may include cristoballite.

The silicon dioxide phase may be present in an amount of 2-50 wt % based on the weight of the anode active material. If the amount of the silicon dioxide phase is less than 2 wt %, an increase in the initial charge/discharge efficiency of the battery will not be enough, and if it is more than 50 wt %, the initial discharge/discharge efficiency will increase, but the discharge capacity of the battery will decrease.

Moreover, the concentration of the silicon phase is higher center portion than center-periphery portion of the silicon-based anode active material, and the concentration of the silicon dioxide phase is higher center-periphery portion than center portion of the silicon-based anode active material. The silicon phase and the silicon dioxide phase may be formed by disproportionation of $SiO_x$. The center portion of the silicon-based anode active material of the present invention is defined as follows. The "center portion" refers to a portion inside a line corresponding to 50% of the maximum value of the length of the anode active material in the vertical direction from a line that is tangent to the anode active material, and the "center-periphery portion" refers to a portion outside the line corresponding to 50%. In addition, "a concentration higher center portion than center-periphery portion of the anode active material" means that the average concentration in the portion inside the line corresponding to 50% of the maximum value of diameter of the anode active material is higher than the average concentration in the portion outside the line.

The above contents will be described in further detail below with respect to the heat-treatment process of the method for preparing the silicon-based anode active material.

The present invention also provides a silicon-based anode active material, which comprises a carbon coating material in addition to a silicon-based anode active material comprising a silicon phase, an $SiO_x$ (0<x<2) phase and a silicon dioxide phase.

The silicon-based anode active material may have a particle size ranging from several tens of nm to several tens of μm, and preferably 100 nm-50 μm.

In addition, in the silicon-based anode active material, the silicon phase is crystalline and has a particle size in the nanometer range. The crystal size of the silicon phase is 1-1000 nm, and the crystal size of the silicon dioxide phase is 1-1000 nm. The silicon phase, $SiO_x$ phase and titanium dioxide phase of the silicon-based anode active material can intercalate and deintercalate lithium.

The present invention also provides a secondary battery, which comprises a cathode comprising a cathode active material, an anode comprising an anode active material, and a separator, wherein the anode active material comprises a silicon phase, an $SiO_x$ (0<x<2) phase, and a silicon dioxide phase.

A secondary battery according to one embodiment of the present invention can be fabricated in the following manner.

For example, the anode can be fabricated by applying the silicon-based anode active material to an anode current collector, followed by drying, and can comprise a conductive material, a binder, a filler and the like.

The anode current collector generally has a thickness of 3-500 μm. The anode current collector is not specifically limited, as long as it has high conductivity without causing a chemical change in the battery. For example, the anode current collector may be made of copper, stainless steel, aluminum, nickel, titanium, calcined carbon, a copper or stainless surface-treated with carbon, nickel, titanium, silver or the like, or an aluminum-cadmium alloy, etc. Like the cathode current collector, fine protrusions can also be formed on the surface of the anode current collector to enhance the binding strength of the anode active material. The anode current collector can be used in various shapes, including a film, a sheet, a foil, a net, a porous material, a foamed agent, a non-woven fabric.

The cathode can be fabricated by mixing a cathode active material, a conductive material, a binder and a solvent to prepare a cathode active material composition, and applying the cathode active material composition directly to a metal current collector, followed by drying.

Examples of the cathode active material include, but are not limited to, layered compounds such as lithium cobalt oxides ($LiCoO_2$) or lithium nickel oxides ($LiNiO_2$), or compounds substituted by at least one transition metal; lithium manganese oxides represented by $Li_{1+2}Mn_{2-y}O_4$ (wherein y ranges from 0 to 0.33), $LiMnO_3$, $LiMn_2O_3$, $LiMnO_2$, etc.; lithium copper oxides ($Li_2CuO_2$); vanadium oxides such as $LiV_3O_8$, $LiFe_3O_4$, $V_2O_5$, $Cu_2V_2O_7$, etc.; Ni site type lithium nickel oxides represented by $LiNi_{1-y}MyO_2$ (wherein M=Co, Mn, Al, Cu, Fe, Mg, B or Ga, and y=0.01 to 0.3); lithium manganese composite oxides represented by $LiMn_{2-y}MyO_2$ (wherein M=Co, Ni, Fe, Cr, Zn or Ta, and y=0.01 to 0.1) or $Li_2Mn_3MO_8$ (wherein M=Fe, Co, Ni, Cu or Zn); $LiMn_2O_4$ wherein Li is partially substituted by alkaline earth metal ions; disulfide compounds; $Fe_2(MoO_4)_3$, and the like.

The cathode current collector has a thickness of 3-500 μm, similar to the anode current collector. The cathode current collector is not specifically limited, as long as it has high conductivity without causing a chemical change in the battery.

The conductive material is generally added in an amount of 1-30 wt % based on the total weight of the cathode active material composition. The conductive material is not specifically limited, as long as it has electrical conductivity without causing a chemical change in the battery. For example, the conductive material may be made of graphite such as natural graphite or artificial graphite; carbon black such as acetylene black, Ketjen black, channel black, furnace black, lamp black or thermal black; conductive fiber such as carbon fiber or metal fiber; metal powder such as carbon fluoride, aluminum or nickel powder; conductive whisker such as zinc oxide or potassium titanate; conductive metal oxide such as titanium oxide; or a conductive material such as a polyphenylene derivative.

The binder serves to assist in binding the active material to the conductive material and the current collector, and is commonly added in an amount of 1 to 50 wt % based on the total weight of the cathode active material composition.

Examples of the binder include polyvinylidene fluoride, polyvinyl alcohol, carboxy methyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), sulfonated-EPDM, styrene-butadiene rubber (SBR), fluorine rubber, and various copolymers.

The filler is selectively used as a component for suppressing the expansion of the electrode, and is not specially limited, as long as it is a fibrous material which causes no chemical change in the battery. Examples of the filler that may be used in the present invention include olefinic polymers, such as polyethylene and polypropylene; and fibrous materials, such as glass fiber and carbon fiber.

The separator is interposed between the cathode and the anode and is made of a thin insulating film having high ion permeability and mechanical strength. The separator generally has a pore size of 0.01-10 μm and a thickness of 5-300 μm. This separator is made of, for example, an olefinic polymer such as a chemical-resistant and hydrophobic polypropylene, or a sheet or non-woven fabric made of glass fiber or polyethylene. If a solid electrolyte such as a polymer is used as the electrolyte, it may also serve as the separator.

The present invention also provides a method for preparing a silicon-based anode active material, the method comprising the steps of: dissolving an alkaline hydroxide in a polar solvent and mixing the solution with $SiO_x$ (0<x<2) to prepare a mixture; and evaporating the polar solvent from the mixture, and then heat-treating the mixture.

In order to prepare the silicon-based anode active material according to one embodiment of the present invention, an alkaline hydroxide is dissolved in a polar solvent and then mixed with $SiO_x$.

The $SiO_x$ may be commercially easily available silicon monoxide.

The alkaline hydroxide that is used in the present invention may be one or more selected from the group consisting of LiOH, NaOH, KOH, $Be(OH)_2$, $Mg(OH)$, $Ca(OH)_2$, and hydrates thereof.

As the solvent in which the alkaline hydroxide is dissolved, any solvent may be used, as long as it can dissolve the alkaline hydroxide and can easily be removed. Examples of the solvent include, but are limited to, water and an alcohol solvent. The alcohol solvent may be ethanol or methanol.

In the step of mixing the alkaline hydroxide with $SiO_x$, $SiO_x$ may be used in an amount of 0.01-30 wt % based on the total weight of the mixture. If the amount of $SiO_x$ is less than 0.01 wt %, the initial coulombic efficiency of the anode active material will be low because the amount of silicon and silicon dioxide formed after heat treatment is small ($SiO_x$ is partially converted to $Si$—$SiO_2$ by heat treatment, and the content of $Si$—$SiO_2$ in $Si$—$SiO_x$—$SiO_2$ is reduced due to a low content of $SiO_x$), and if it is more than 30 wt %, the capacity of the anode active material will be greatly reduced because the amount of $Si$—$SiO_2$ formed after heat treatment is large.

The method for preparing the silicon-based anode active material according to one embodiment of the present invention comprises the step of evaporating the polar solvent from the prepared mixture, followed by heat treatment.

Evaporating the polar solvent can be carried out at 80-120° C. and can be carried out in an alumina boat preheated to 80-120° C. However, evaporation of the polar solvent may also be carried out at any temperature at which the polar solvent can be evaporated. Meanwhile, despite evaporation of the polar solvent, the alkaline hydroxide remains on the surface of $SiO_x$ particles.

The mixture remaining after evaporation of the polar solvent can be heat-treated at a temperature of 750-1000° C. for 5-120 minutes. If the heat-treatment temperature is lower than 750° C., crystalline silicon dioxide will not form, and if it is higher than 1000° C., a large amount of crystalline silicon will be produced to reduce the lifetime characteristics of the secondary battery and cause an excessive amount of energy to be consumed. In addition, the heat-treatment time is shorter than 5 minutes, crystalline silicon dioxide will not form easily, and if it is longer than 120 minutes, it will not be preferable in terms of energy efficiency, because it is significantly longer than the time required to form crystalline silicon dioxide.

As the heat-treatment is carried out, $SiO_x$ is disproportionated into silicon and silicon dioxide. Specifically, oxygen in $SiO_x$ moves to the outside (surface) to form amorphous $SiO_2$, and silicon separated from oxygen binds to another silicon separated from oxygen to form a silicon crystal which is present in $SiO_x$ phase, and amorphous $SiO_2$ is formed mainly on the outside (surface) rather than inside the $SiO_x$ particles. As the heat-treatment temperature or time increases, amorphous $SiO_x$ gradually decreases and crystalline Si and crystalline $SiO_2$ increase.

Figure 4:
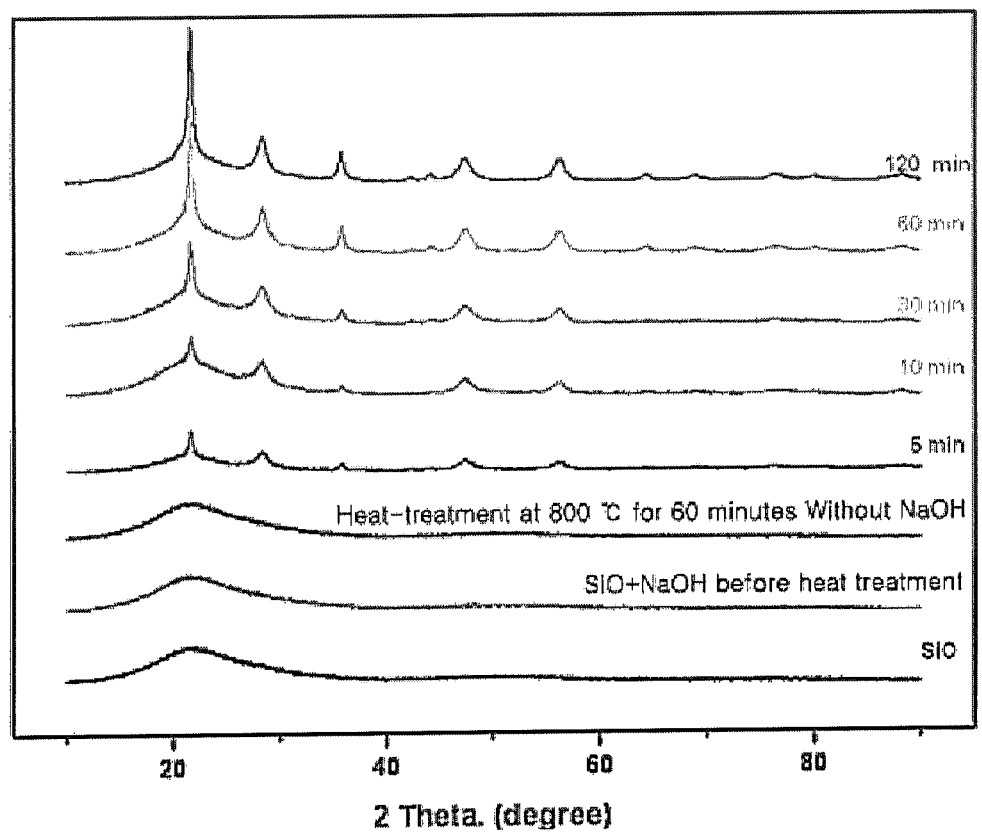
FIG. 4 shows the X-ray diffraction spectra of silicon-based anode active material particles prepared with or without the use of NaOH and for various heat-treatment times.

In the present invention, the heat treatment is carried out in a state in which the alkaline hydroxide is present on the surface of $SiO_x$ particles, thereby promoting the formation of crystalline $SiO_2$. As can be seen in FIG. 4, when the alkaline hydroxide is not used, the crystalline peak of $SiO_2$ is not formed, even when the heat-treatment is carried out at the same temperature. However, when the alkaline hydroxide is used, the intensity of the crystalline peak of $SiO_2$ significantly increases (around 2 Theta=21° while a Si crystal grows. Specifically, in the prior art in which heat treatment is carried out in order to form a composite of SiO and carbon or in order to coat SiO with a carbon precursor or carbon, only Si crystals grow (around 2 Theta=28.5° in the XRD), whereas in the present invention in which heat treatment is carried out in a state in which the alkaline hydroxide is present on the surface of $SiO_x$, crystalline $SiO_2$ grows, and initial coulombic efficiency (discharge capacity/charge capacity×100; the ratio of lithium first charged into the silicon-based compound to the amount of lithium first discharged from the silicon-based compound) increases. Grown crystalline $SiO_{lipf6}$ is electrochemically inactive (non-reactive with lithium), and $SiO_x$ is divided into an electrochemically active portion (reactive with lithium) and an electrochemically inactive portion. It is believed that, because the molar concentration of oxygen relative to Si in the electrochemically active portion of $SiO_x$ is lower than that in SiO, the initial coulombic efficiency increases.

The method for preparing the silicon-based anode active material according to one embodiment of the present invention may further comprise a step wherein the prepared mixture is immersed in distilled water, followed by filtration. In this step, alkaline hydroxide that has adhered to the surface of the $SiO_x$ particles is removed. In this step, the mixture can be kept in distilled water for a sufficient time such that alkaline hydroxide adhering to the surface of the silicon-based anode active electrode can be removed.

The present invention also provides a method for preparing a silicon-based anode active material, the method comprising the steps of: mixing an alkaline hydroxide in a polar solvent and mixing the solution with $SiO_x$ to prepare a mixture; evaporating the polar solvent from the mixture, and then heat-treating the mixture; and coating the heat-treated mixture with carbon.

The method for preparing the silicon-based anode active material may comprise the step of coating with carbon in order to increase the electrical conductivity of the secondary battery. Herein, the amount of carbon used to coat the mixture may be 1-30 wt % of the total weight of the silicon-based anode active material. If the amount of carbon used to coat the mixture is less than 1 wt %, a uniform coating layer will not be formed so that the electrical conductivity of the battery will not increase, and if it is more than 30 wt %, an additional irreversible reaction will occur due to the conductive coating layer to greatly reduce the discharge capacity of the battery.

In addition, the starting material $SiO_x$ may be one coated with carbon, and in this case, the step of coating the silicon-based anode active material with carbon can be omitted. This coating with carbon can be achieved by dispersing a carbon precursor in a solvent such as tetrahydrofuran (THF) or alcohol and adding the dispersion to the silicon oxide, followed by drying and heat treatment. Alternatively, it may also be performed by supplying acetylene gas to the silicon oxide. In addition, any method may be used without limitation, as long as it can coat an electrode active material with carbon.

According to the present invention, a silicon-based anode active material having initial coulombic efficiency higher than that of a conventional silicon-based anode active material can be prepared in large amounts using a simple process, and thus is useful as an anode active material for electrochemical batteries such as lithium secondary batteries.

Hereinafter, the present invention will be described in further detail with reference to the preferred examples. It is to be understood, however, that these examples are for illustrative purposes only and are not intended to limit the scope of the present invention.

Example 1: Preparation of Silicon-Based Anode Active Material 1

Mixing of Alkaline Hydroxide with Silicon-Based Material 50 mg of sodium hydroxide was dissolved in ethanol, and 1 g of silicon monoxide was added to the sodium hydroxide solution and stirred for 10 minutes or more.

Solvent Evaporation and Heat Treatment

The mixture solution of silicon monoxide and sodium hydroxide was added to an alumina boat heated to 80-120° C., in which ethanol was evaporated from the mixture. After completion of the evaporation of the solvent, the alumina boat containing the silicon monoxide/sodium hydroxide mixture was placed in a quartz tube furnace and was heat-treated at 800° C. for 5 minutes in an argon atmosphere. Then, the quartz tube furnace was cooled to room temperature, thereby preparing a silicon-based anode active material.

Immersion in Solvent, Followed by Filtration

The silicon-based anode active material was collected from the alumina boat and immersed in distilled water for 2 hours, followed by filtration, thereby removing sodium hydroxide from the surface of the silicon-based anode active material (see FIG. 1).

Example 2: Preparation of Silicon-Based Anode Active Material 2

A silicon-based anode active material was prepared in the same manner as Example 1, except that the heat treatment was carried out for 10 minutes.

Example 3: Preparation of Silicon-Based Anode Active Material 3

A silicon-based anode active material was prepared in the same manner as Example 1, except that the heat treatment was carried out for 30 minutes.

Example 4: Preparation of Silicon-Based Anode Active Material 4

A silicon-based anode active material was prepared in the same manner as Example 1, except that the heat treatment was carried out for 60 minutes.

Example 5: Preparation of Silicon-Based Anode Active Material 5

A silicon-based anode active material was prepared in the same manner as Example 1, except that the heat treatment was carried out for 120 minutes.

Example 6: Preparation of Silicon-Based Anode Active Material Coated with Conductive Carbon Coating Layer 1

20 g of the silicon-based anode active material prepared in Example 1 was introduced in a rotary tube furnace, and argon gas was supplied to the furnace at a rate of 0.5 L/min, and then the anode active material was heated to 800° C. at a rate of 5° C./min. While the rotary tube furnace was rotated at a speed of 10 rpm, the anode active material was heat-treated while argon gas and acetylene gas were supplied at rates of 1.8 L/min and 0.3 L/min to the furnace, respectively, thereby preparing a silicon-based anode active material coated with a conductive carbon coating layer. The carbon content of the conductive carbon coating layer was 10 wt % based on the weight of the anode active material.

Example 7: Preparation of Silicon-Based Anode Active Material Coated with Conductive Carbon Coating Layer 2

A silicon-based anode active material coated with a conductive carbon coating layer was prepared in the same manner as Example 6, except that 20 g of the silicon-based anode active material prepared in Example 2 was introduced in the rotary tube furnace. The carbon content of the conductive carbon coating layer was 10 wt % based on the weight of the anode active material.

Example 8: Preparation of Silicon-Based Anode Active Material Coated with Conductive Carbon Coating Layer 3

A silicon-based anode active material coated with a conductive carbon coating layer was prepared in the same manner as Example 6, except that 20 g of the silicon-based anode active material prepared in Example 3 was introduced in the rotary tube furnace. The carbon content of the conductive carbon coating layer was 10 wt % based on the weight of the anode active material.

Example 9: Preparation of Silicon-Based Anode Active Material Coated with Conductive Carbon Coating Layer 4

A silicon-based anode active material coated with a conductive carbon coating layer was prepared in the same manner as Example 6, except that 20 g of the silicon-based anode active material prepared in Example 4 was introduced in the rotary tube furnace. The carbon content of the conductive carbon coating layer was 10 wt % based on the weight of the anode active material.

Example 10: Preparation of Silicon-Based Anode Active Material Coated with Conductive Carbon Coating Layer 5

A silicon-based anode active material coated with a conductive carbon coating layer was prepared in the same manner as Example 6, except that 20 g of the silicon-based anode active material prepared in Example 5 was introduced in the rotary tube furnace. The carbon content of the conductive carbon coating layer was 10 wt % based on the weight of the anode active material.

Comparative Example 1: Preparation of Anode Active Material Consisting of Silicon Monoxide Alone An anode active material consisting of silicon monoxide was prepared.

Comparative Example 2: Preparation of Anode Active Material Consisting of Silicon Monoxide Coated with Carbon An anode active material was prepared by coating carbon in the same manner as Example 6.

The starting materials and process conditions used in Examples 1 to 10 and Comparative Examples 1 and 2 are shown in Table 1 below.

Fabrication of Batteries

Each of the anode active materials prepared in Examples 1 to 10 and Comparative Examples 1 and 2, acetylene black as a conductive material, and polyvinylidene fluoride, (PVdF) as a binder were mixed with each other at a weight ratio of 88:2:10, and each of the mixtures was dissolved in N-methyl-2-pyrrolidone (NMP), thereby preparing uniform electrode slurries. Each of the prepared electrode slurries was applied to one surface of a copper current collector to a thickness of 65 μm, and the resulting structures were dried, rolled, and punched to a desired size, thereby fabricating electrodes.

Meanwhile, ethylene carbonate and (EC) and diethyl carbonate (DEC) were mixed with each other at a volume ratio of 30:70, and $LiPF_6$ was added to the mixture, thereby preparing a non-aqueous electrolyte of 1M $LiPF_6$.

Each of the above-fabricated electrodes was used as an anode, and a metal foil was used as a cathode. A polyolefin separator was interposed between the two electrodes, and then the electrolyte was injected into the resulting structures, thereby fabricating coin-type batteries.

Analysis of Surfaces, Structures and Components of Silicon-Based Anode Active Materials The surfaces, structures and components of the silicon-based anode active materials prepared in the Examples of the present invention were analyzed by scanning electron microscopy (SEM), transmission electron microscopy (TEM) and X-ray diffraction (XRD), and the results of the analysis are shown in FIGS. 2 to 5.

Figure 2:
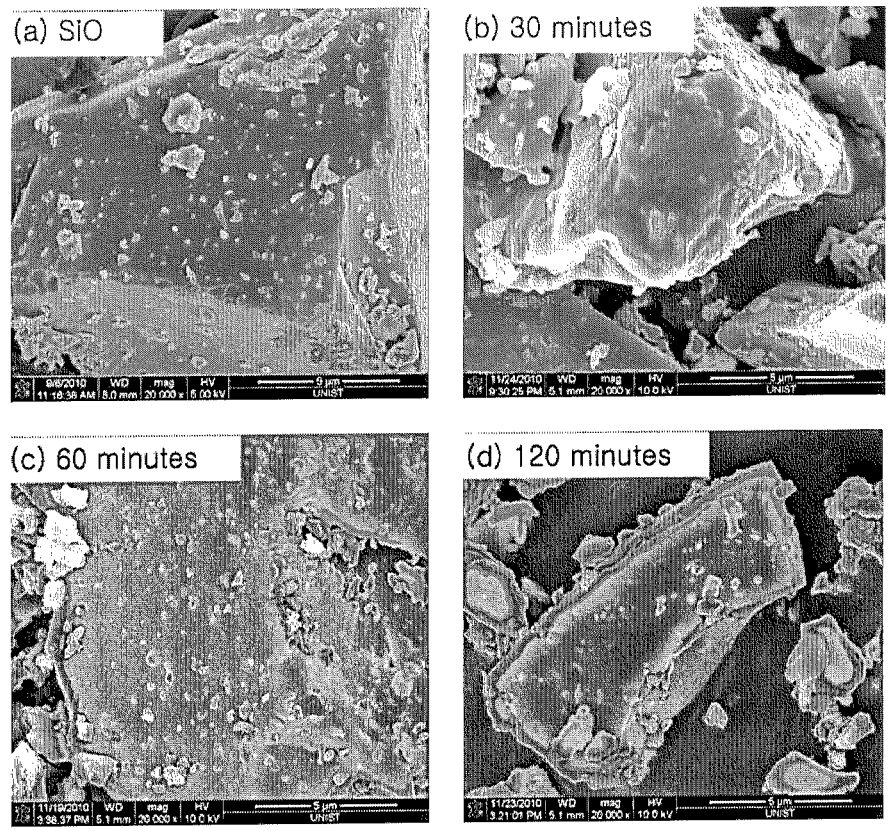
FIG. 2 is a set of scanning electron microscope (SEM) photographs of silicon-based anode active material particles heat-treated for various times according to embodiments of the present invention.

FIG. 2 is a set of scanning electron microscope (SEM) photographs of SiO and the silicon-based anode active material particles heat-treated for various times. In FIG. 2, (a): SiO, (b): particles heat-treated for 30 minutes, (c): particles heat-treated for 60 minutes, and (d): particles heat-treated for 120 minutes). The heat treatment was carried out at 800° C. As can be seen in FIG. 2, the silicon dioxide phase was dispersed in the SiO phase.

Figure 3:
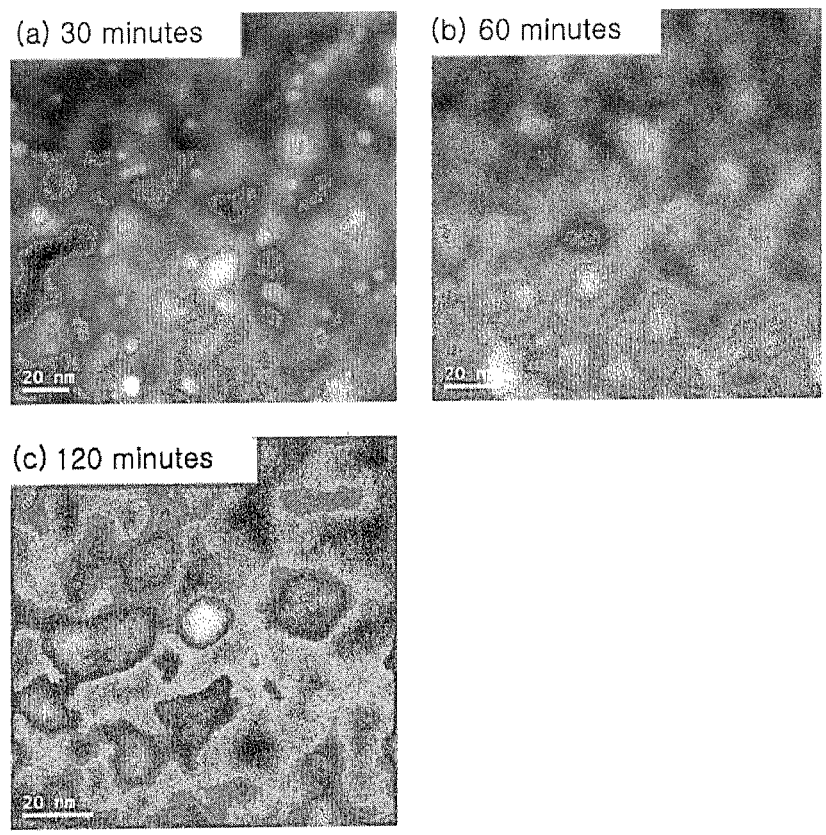
FIG. 3 is a set of transmission electron microscope (TEM) photographs of silicon-based anode active material particles according to embodiments of the present invention.

FIG. 3 is a set of transmission electron microscope (TEM) photographs of the silicon-based anode active material particles prepared in the Examples of the present invention. In FIG. 3, (a): particles heat-treated for 30 minutes; (b): particles heat-treated for 60 minutes; and (c): particles heat-

TABLE 1

| Example | Starting material | Content of $SiO_2$ (wt %) | Heat-treatment time and temperature | Carbon content (wt %) | Coating conditions |
|---|---|---|---|---|---|
| Example 1 | SiO + NaOH | 5.5 | 800° C., 5 min | — | — |
| Example 2 | SiO + NaOH | 8.9 | 800° C., 10 min | — | |
| Example 3 | SiO + NaOH | 17.3 | 800° C., 30 min | — | |
| Example 4 | SiO + NaOH | 32.4 | 800° C., 60 min | — | |
| Example 5 | SiO + NaOH | 35.5 | 800° C., 120 min | — | |
| Example 6 | SiO + NaOH | 4.5 | 800° C., 5 min | 10 | 800° C., 5 hr |
| Example 7 | SiO + NaOH | 8.2 | 800° C., 10 min | 10 | 800° C., 5 hr |
| Example 8 | SiO + NaOH | 16.7 | 800° C., 30 min | 10 | 800° C., 5 hr |
| Example 9 | SiO + NaOH | 28.6 | 800° C., 60 min | 10 | 800° C., 5 hr |
| Example 10 | SiO + NaOH | 33.2 | 800° C., 120 min | 10 | 800° C., 5 hr |
| Comparative Example 1 | SiO | — | — | — | — |
| Comparative Example 2 | SiO | — | — | 10 | 800° C., 5 hr |

Using the anode active materials prepared in Examples to 10 and Comparative Examples 1 and 2, secondary batteries were fabricated in the following manner.

treated for 120 minutes. The heat-treatment was carried out at 800° C. As can be seen in FIG. 3, silicon crystals increase as the heat-treatment time increased.

FIG. 4 shows the X-ray diffraction spectra of silicon-based anode active materials prepared with or without the use of NaOH and for various heat-treatment times. As can be seen in FIG. 4, when the heat-treatment was carried out at 800° C. for 5 minutes, the peak intensity increased, and the intensity of the peak $SiO_2$ increased as the heat-treatment time increased (around 2 Theta=21°. In addition, the peak of crystalline Si appeared at around Theta=28.5°. Furthermore, the results of XRD quantitative analysis indicated that the contents (wt %) of the formed crystalline $SiO_2$ in the anode active materials were as shown in Table 1 above. This suggests that, when the alkaline hydroxide was used, the silicon-based anode active material according to the present invention was formed.

Figure 5:
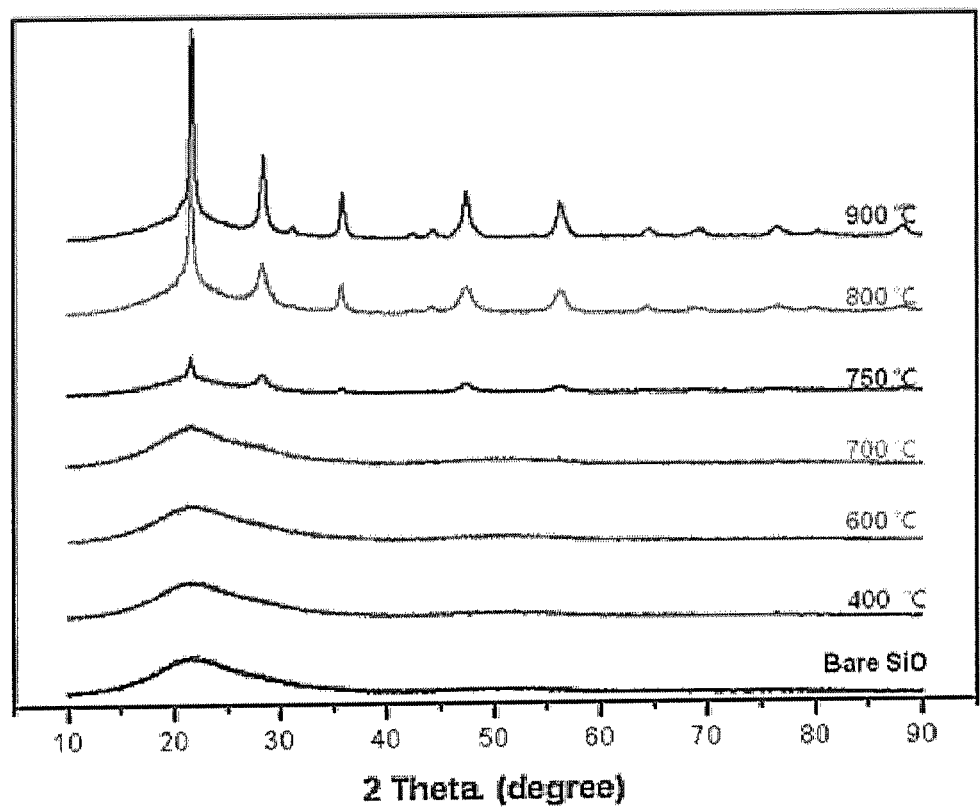
FIG. 5 shows the X-ray diffraction spectra of silicon-based anode active material particles as a function of heat-treatment time.

FIG. 5 shows the X-ray diffraction spectra of the silicon-based anode active materials as a function of heat-treatment temperature. As can be seen in FIG. 5, at 700° C. or lower, a weak peak similar to carbon dioxide appeared, and at 750° C. or higher, intense peaks appeared. Similar peaks appeared at 800° C. and 900° C.

Table 2 below shows the discharge capacities, charge capacities and initial coulombic efficiencies of the secondary batteries fabricated using the anode active materials prepared in Examples 1 to 10 and Comparative Examples 1 and 2.

TABLE 2

| Example | Discharge capacity (mAh/g) | Charge capacity (mAh/g) | Initial coulombic efficiency (%) |
| --- | --- | --- | --- |
| Example 1 | 1575.3 | 2022.2 | 77.9 |
| Example 2 | 1518.6 | 1944.4 | 78.1 |
| Example 3 | 1376.8 | 1762.9 | 78.1 |
| Example 4 | 1128.6 | 1441.4 | 78.3 |
| Example 5 | 1081.1 | 1377.2 | 78.5 |
| Example 6 | 1528.2 | 1854.6 | 82.4 |
| Example 7 | 1451.8 | 1764.0 | 82.3 |
| Example 8 | 1308.4 | 1584.0 | 82.6 |
| Example 9 | 1135.8 | 1370.1 | 82.9 |
| Example 10 | 1047.2 | 1261.7 | 83.0 |
| Comparative Example 1 | 1653.8 | 2355.8 | 70.2 |
| Comparative Example 2 | 1575.0 | 2114.1 | 74.5 |

As can be seen in Table 2 above, the discharge capacities of the secondary batteries comprising the anode active materials prepared in Examples 1 to 5 were somewhat lower than that of the secondary battery comprising the anode active material of Comparative Example 1, due to the formation of crystalline $SiO_2$, but the initial coulombic efficiencies of Examples 1 to 5 were about 8% higher than that of Comparative Example 1. In addition, the initial coulombic efficiencies of the secondary batteries comprising the anode active materials prepared in Examples 6 to 10 were about 8% higher than that of the secondary battery comprising the anode active material of Comparative Example 2. Meanwhile, in the anode active material of Comparative Example 2, which consists of silicon monoxide surface-coated with carbon, the initial coulombic efficiency was about 4% higher than that of Comparative Example 1, because the surface reaction was controlled so that the initial irreversible reaction was reduced. This indicates that coating of silicon monoxide with carbon increases initial coulombic efficiency and this increase can be found in the carbon-coated anode active materials of Examples 6 to 10. Thus, it can be seen that the anode active material prepared using the alkaline hydroxide by heat treatment of silicon monoxide has high initial coulombic efficiency.

As described above, according to the present invention, a silicon-based anode active material having initial coulombic efficiency higher than that of a conventional silicon-based anode active material can be prepared in large amounts using a simple process, and thus is useful as an anode active material for electrochemical batteries such as lithium secondary batteries.

What is claimed is:

1. A silicon-based anode active material particle having a center portion of the particle and a center-periphery portion of the particle, the particle comprising:
    a silicon phase; a $SiO_x$ (0<x<2) phase; and a silicon dioxide phase wherein the silicon dioxide phase is dispersed in the $SiO_x$ phase and comprises cristoballite,
    wherein the concentration of the silicon dioxide phase is higher in the center-periphery portion than in the center portion,
    wherein the concentration of the silicon phase is higher in the center portion than in the center-periphery portion.

2. The silicon-based anode active material particle of claim 1, wherein the silicon dioxide phase is crystalline.

3. The silicon-based anode active material particle of claim 1, wherein the $SiO_x$ is silicon monoxide.

4. The silicon-based anode active material particle of claim 1, wherein the silicon dioxide phase is present in an amount of 2-50 wt % based on the weight of the silicon-based anode active material particle.

5. The silicon-based anode active material particle of claim 1, wherein the silicon phase and the silicon dioxide phase are formed by disproportionation of $SiO_x$ (0<x<2).

6. The silicon-based anode active material particle of claim 1, further comprising a carbon coating material.

7. A secondary battery, which comprises a cathode comprising a cathode active material, an anode comprising an anode active material, and a separator, wherein the anode active material comprises the silicon-based anode active material particle of claim 1.

* * * * *